United States Patent
Paik et al.

(10) Patent No.: US 7,649,604 B2
(45) Date of Patent: Jan. 19, 2010

(54) IN-PLANE SWITCHING MODE LIQUID CRYSTAL DISPLAY DEVICE AND METHOD OF FABRICATING THEREOF

(75) Inventors: Sang-Yoon Paik, Seoul (KR); Hong-Man Moon, Gyeongsangbuk-Do (KR)

(73) Assignee: LG Display Co., Ltd., Seoul (KR)

( * ) Notice: Subject to any disclaimer, the term of this patent is extended or adjusted under 35 U.S.C. 154(b) by 506 days.

(21) Appl. No.: 11/299,630

(22) Filed: Dec. 13, 2005

(65) Prior Publication Data
US 2006/0279668 A1 Dec. 14, 2006

(30) Foreign Application Priority Data
Jun. 14, 2005 (KR) .................... 10-2005-0051106

(51) Int. Cl.
G02F 1/1343 (2006.01)
G02F 1/1368 (2006.01)

(52) U.S. Cl. .................... 349/141; 349/43; 349/48; 349/144

(58) Field of Classification Search .................... 349/48, 349/141, 144
See application file for complete search history.

(56) References Cited

U.S. PATENT DOCUMENTS

| | | | | |
|---|---|---|---|---|
| 5,877,512 | A * | 3/1999 | Kim | 257/57 |
| 6,274,884 | B1 * | 8/2001 | Lee et al. | 257/57 |
| 6,459,465 | B1 * | 10/2002 | Lee | 349/141 |
| 6,747,712 | B2 | 6/2004 | Noh et al. | 349/39 |
| 6,839,117 | B1 | 1/2005 | Park et al. | 349/141 |
| 7,034,789 | B2 | 4/2006 | Takeuchi et al. | 345/90 |
| 7,164,402 | B2 | 1/2007 | Yanagawa et al. | 345/87 |
| 7,551,169 | B2 | 6/2009 | Yanagawa et al. | 345/204 |
| 2003/0020861 | A1 * | 1/2003 | Yoo | 349/141 |
| 2003/0090601 | A1 | 5/2003 | Kim et al. | 349/43 |

(Continued)

FOREIGN PATENT DOCUMENTS

CN 1414422 A 4/2003

(Continued)

*Primary Examiner*—Andrew Schechter
(74) *Attorney, Agent, or Firm*—Morgan Lewis & Bockius LLP (57) ABSTRACT

A liquid crystal display device includes first and second substrates, a liquid crystal layer formed between the first and second substrates, a plurality of pixel regions defined in a matrix configuration on the first substrate, a plurality of gate lines extending along a first direction on the first substrate and dividing each of the pixel regions into first and second pixels that are adjacent to each other along a second direction substantially perpendicular to the first direction, a plurality of data lines extending along the second direction and crossing the gate lines to define the first and second pixel regions together with the gate lines, a plurality of first and second electrodes for generating an in-plane electric field in the first and second pixels regions, and a switching device formed at the crossing the gate and data lines and driving the first and second pixel regions, wherein the switching device includes a gate electrode, a semiconductor layer, and source and drain electrodes, and the drain electrode includes a first drain electrode connected with the second electrode of the first pixel region and a second drain electrode connected with the second electrode of the second pixel region.

10 Claims, 10 Drawing Sheets

U.S. PATENT DOCUMENTS

2004/0125057 A1* 7/2004 Moon et al. .................. 345/87
2005/0078258 A1* 4/2005 Kim et al. ................... 349/141

FOREIGN PATENT DOCUMENTS

| | | | |
|---|---|---|---|
| CN | 1573442 | A | 2/2005 |
| CN | 1619393 | A | 5/2005 |
| JP | 09-236820 | | 9/1997 |
| JP | 2002-122876 | | 4/2002 |
| JP | 2002-169179 | | 6/2002 |
| JP | 2003-021845 | | 1/2003 |
| JP | 2004-78157 | | 3/2004 |

* cited by examiner

IN-PLANE SWITCHING MODE LIQUID CRYSTAL DISPLAY DEVICE AND METHOD OF FABRICATING THEREOF

The present application claims the benefit of Korean Patent Application No. 2005-51106 filed in Korea on Jun. 14, 2005, which is hereby incorporated by reference.

BACKGROUND OF THE INVENTION

1. Field of the Invention

The present invention relates to a liquid crystal display (LCD) device and, more particularly, to an In-Plane Switching (IPS) mode LCD device and its fabrication method.

2. Background of the Related Art

An LCD device is commonly used for producing high quality images while using low power consumption. The LCD device includes a thin film transistor (TFT) array substrate and a color filter substrate attached together in an opposing manner with a uniform interval therebetween, and a liquid crystal layer is formed between the TFT array substrate and the color filter substrate. The TFT array substrate includes pixel units arranged in a matrix configuration, and each unit pixel includes a TFT, a pixel electrode, and a capacitor. The color filter substrate includes a common electrode for inducing an electric field together with the pixel electrode to the liquid crystal layer, an RGB color filter for achieving colors, and a black matrix.

An alignment film is formed on opposing surfaces of the TFT array substrate and the color filter substrate, and a rubbing technique is performed to initially align the liquid crystal layer along a certain direction. When an electric field is generated between the pixel electrode formed according to each unit pixel on the TFT array substrate and the common electrode formed on the entire surface of the color filter substrate, liquid crystals of the liquid crystal layer rotate due to dielectric anisotropy, thereby transmitting or blocking light of each of the unit pixels in order to display a character or an image. However, the above-described twisted nematic (TN) mode LCD device is disadvantageous since its viewing angle is narrow. Thus, an In-Plane Switching (IPS) mode LCD is being developed that solves the problem of narrow viewing angle by aligning liquid crystal molecules along an almost horizontal (in-plane) direction.

Figure 1A:
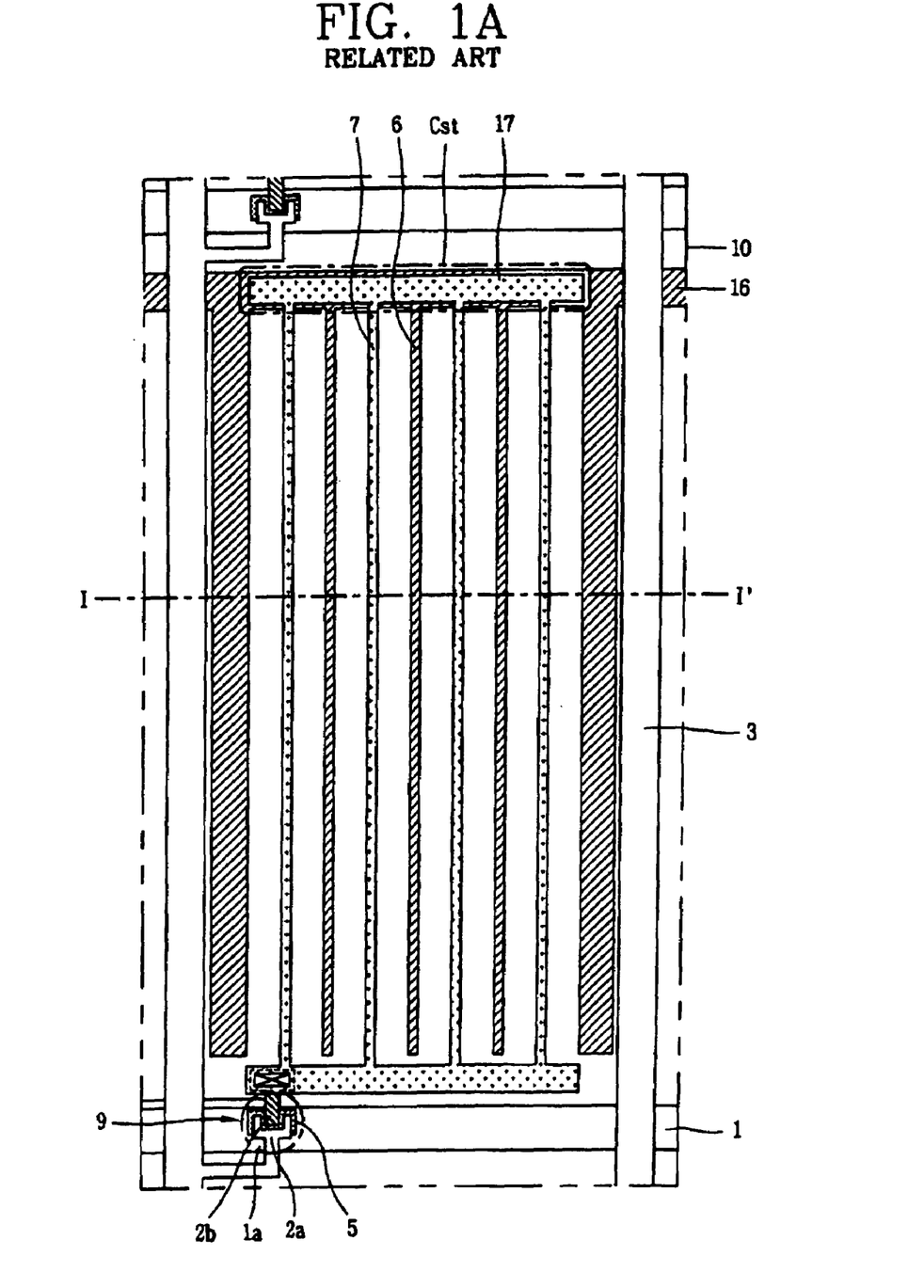
FIG. 1A is a plan view of an In-Plane Switching mode LCD device according to the related art.
Figure 1B:
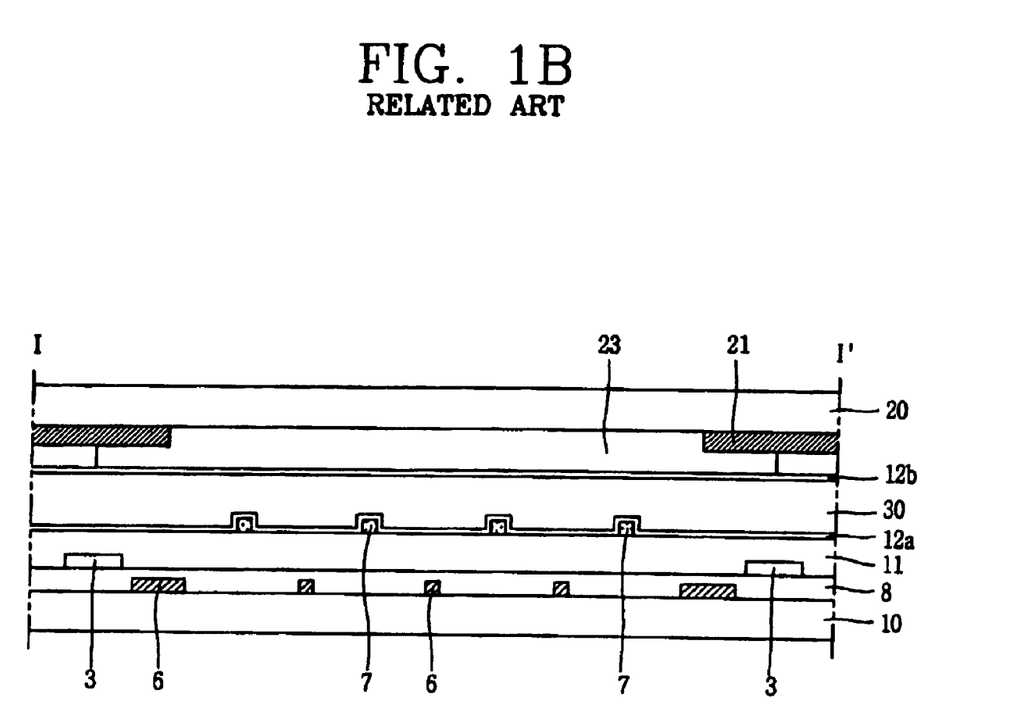
FIG. 1B is a cross-sectional view along I-I' of FIG. 1A an In-Plane Switching mode LCD device according to the related art.

FIG. 1A is a plan view of an In-Plane Switching mode LCD device according to the related art, and FIG. 1B is a cross-sectional view along I-I' of FIG. 1A an In-Plane Switching mode LCD device according to the related art. In FIG. 1A, gate lines 1 and data lines 3 are arranged vertically and horizontally to define a pixel region on a transparent first substrate 10. Specifically, an n-number of the gate lines 1 and an m-number of the data lines 3 cross over to make an n-by-m number of pixels. However, for purposes of brevity, only a single representative unit pixel is shown in FIGS. 1A and 1B.

In FIG. 1A, a TFT 9 including a gate electrode 1a, a semiconductor layer 5, and source/drain electrodes 2a and 2b are disposed at the crossing of the gate line 1 and the data line 3. The gate electrode 1a and the source/drain electrodes 2a and 2b are connected with the gate line 1 and the data line 3, respectively, and a gate insulation film 8 (in FIG. 1B) is stacked over the entire surface of the substrate.

In the pixel region defined by the gate and data lines 1 and 3, a common line 16 is arranged to be parallel with the gate line 1, and a pair of electrodes (i.e., a common electrode 6 and a pixel electrode 7 for switching liquid crystal molecules) are arranged in parallel with the data line 3. The common electrode 6 is simultaneously formed together with the gate line 1 and is connected with the common line 16, and the pixel electrode 7 is connected with the drain electrode 2b of the TFT 9. Next, a passivation film 11 (in FIG. 1B) is formed entirely on the substrate 10 including the source/drain electrodes 2a and 2b, and the pixel electrode 7 is formed on the passivation film 11. Then, a pixel electrode line 17 overlapping with the common line 16 and connected with the pixel electrode 7 forms a storage capacitor Cst with the gate insulation film 8 and the passivation film 11 interposed therebetween.

In FIG. 1B, a black matrix 21 for preventing light leakage to the TFT 9, the gate line 1, and the data line 3, and a color filter 23 for achieving colors are formed on a second substrate 20. Then, an overcoat film (not shown) for planarizing the color filter 23 can be coated thereon, and alignment films 12a and 12b for determining an initial alignment direction of liquid crystals are coated on the facing surfaces of the first and second substrates 10 and 20. In addition, a liquid crystal layer 30 for controlling light transmittance by a voltage applied to the common electrode 6 and the pixel electrode 7 is formed between the first and second substrates 10 and 20.

In the IPS mode LCD device having the above-described structure, each pixel is switched by the TFT 9, and a pixel voltage can be maintained by the storage capacitor Cst However, in terms of the structure of the TFT, the gate electrode 1a and the source electrode 2a overlap with each other and a parasitic capacitance is generated at such overlap portions which changes the pixel voltage. In addition, the parasitic capacitance is changed according to an area where the gate electrode and the source electrode overlaps and an area where the gate electrode and the gate electrode overlaps, respectively. In particular, according to the tendency of enlargement in substrate size, a stitch model, which is subjected to an exposure process several times with respect to the same pattern, has a problem that an area of the overlap region (between the gate and source electrodes and between the gate and drain electrodes) is different at each pixel. If the overall area of the TFT is different, the parasitic capacitance is different, so a variation rate of the pixel voltage is also different. Accordingly, picture quality of the LCD device may be degraded due to the non-uniformity of the parasitic capacitance according to a position of the pixel.

BRIEF DESCRIPTION OF THE INVENTION

Accordingly, the present invention is directed to an LCD device and fabricating method thereof that substantially obviates one or more of the problems due to limitations and disadvantages of the related art.

An object of the present invention is to provide an LCD device capable of maintaining a uniform pixel voltage over an entire pixel.

Another object of the present invention is to provide a fabrication method of an LCD device capable of maintaining a uniform pixel voltage over an entire pixel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a liquid crystal display device includes first and second substrates, a liquid crystal layer formed between the first and second substrates, a plurality of pixel regions defined in a matrix configuration on the first substrate, a plurality of gate lines extending along a first direction on the first substrate and dividing each of the pixel regions into first and second pixels that are adjacent to each other along a second direction substantially perpendicular to the first direction, a plurality of data lines extending along the second direction and crossing the gate lines to define the first and second pixel regions together with the gate lines, a plurality of first and second electrodes for generating an in-plane electric field in the first and second pixels regions, and a switching device formed at the crossing the gate and data lines and driving the first and second pixel regions, wherein the switching device includes a gate electrode, a semiconductor layer, and source and drain electrodes, and the drain electrode includes a first drain electrode connected with the second electrode of the first pixel region and a second drain electrode connected with the second electrode of the second pixel region.

In another aspect, a method for fabricating a liquid crystal display device includes preparing first and second substrates, forming a plurality of gate lines and common lines arranged along a first direction on the first substrate and a plurality of common electrodes extending from the common lines, forming a plurality of data lines arranged along a second direction substantially perpendicular to the first direction and crossing the common lines to define a plurality of pixel region, each pixel region including first and second pixel regions adjacent to each other along the second direction, a source electrode on the gate line, and a drain electrode spaced apart from the source electrode and divided into first and second drain electrodes, forming a plurality of pixel electrodes, for generating an in-plane electric field together with the common electrodes in the first and second pixel regions, a pixel electrode line for electrically interconnecting the pixel electrodes, and first and second storage capacitors in the first and second pixel regions by overlapping with the common lines, and forming a liquid crystal layer between the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 2A:
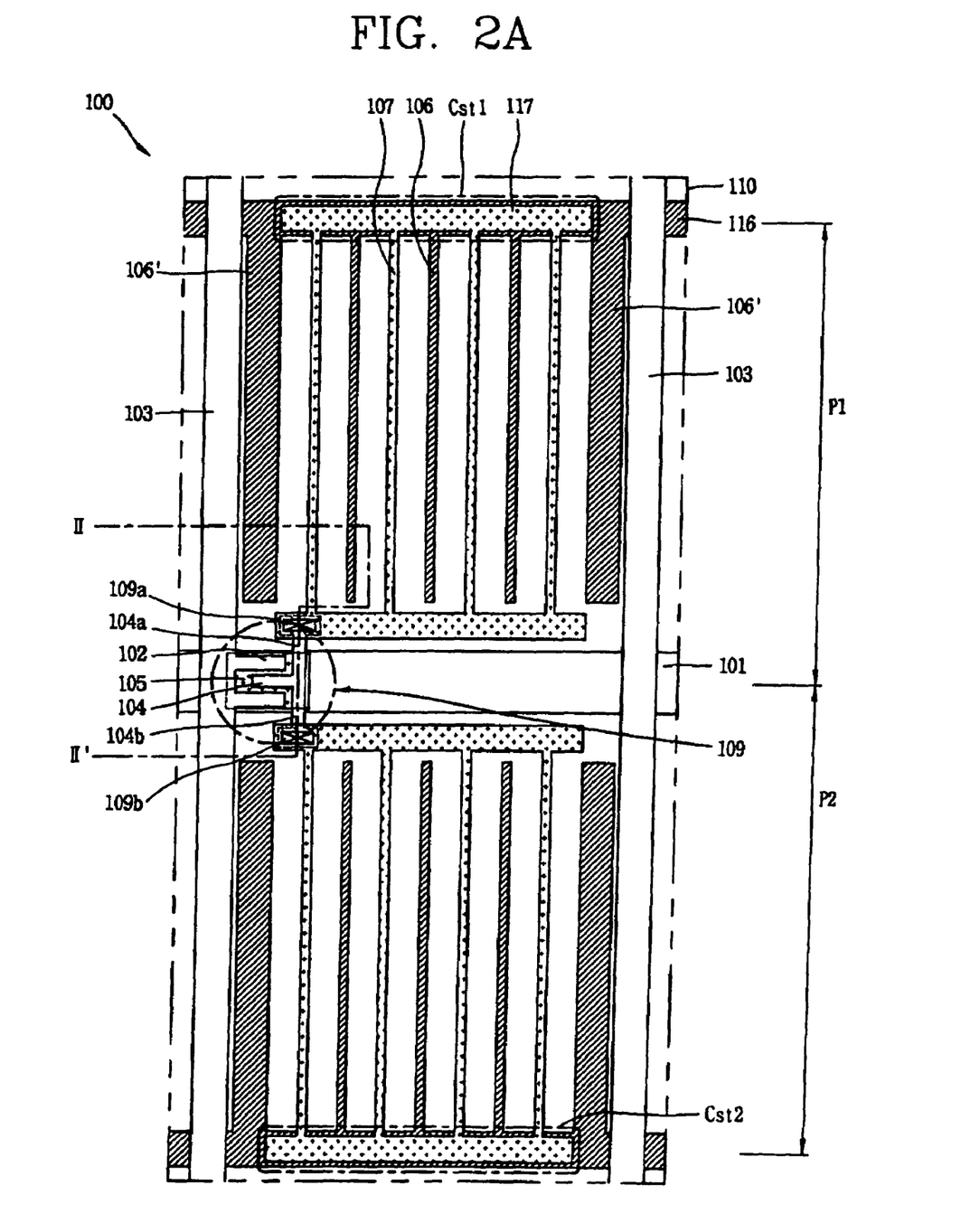
FIG. 2A is a plan view of an exemplary In-Plane Switching mode LCD device according to the present invention.
Figure 2B:
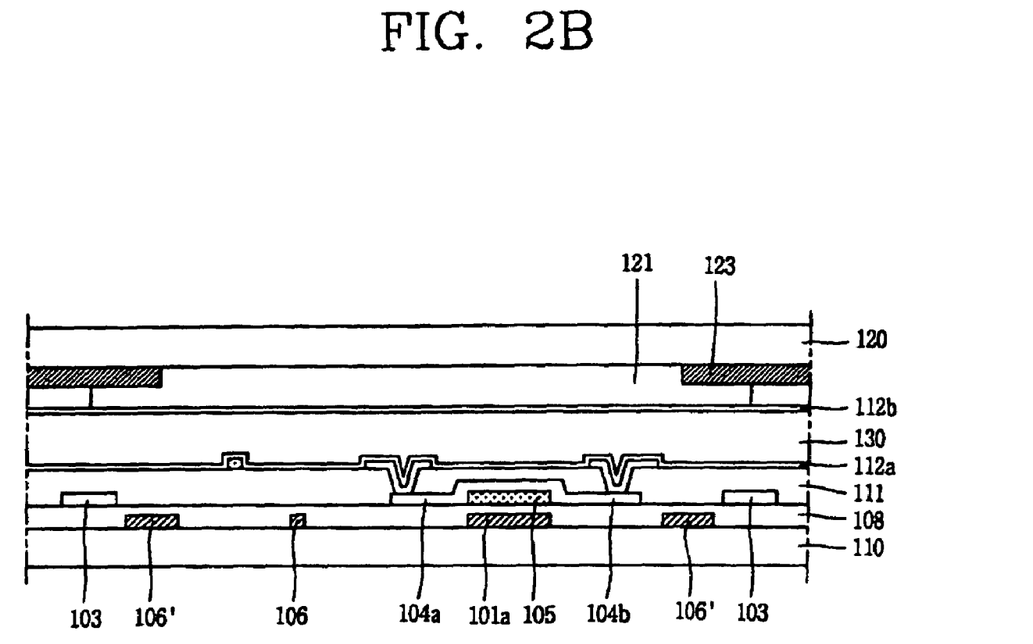
FIG. 2B is a cross-sectional view along II-II' of FIG. 2A an exemplary In-Plane Switching mode LCD device according to the present invention.

FIG. 2A is a plan view of an exemplary In-Plane Switching mode LCD device according to the present invention, and FIG. 2B is a cross-sectional view along II-II' of FIG. 2A an exemplary In-Plane Switching mode LCD device according to the present invention. In FIG. 2A, an LCD device 100 includes a gate line 101 arranged along a first direction on a transparent first substrate 110 and a data line 103 crossing the gate line 101 to define a pixel region. Accordingly, a first pixel (P1) and a second pixel (P2) are divided based upon the gate line 101.

In FIG. 2A, a switching device 109 is formed on the gate line 101 crossing the data line 103, and includes a gate electrode 101a (in FIG. 2B) formed as a portion of the gate line 101, a source electrode 102 extending from the data line 103, and a drain electrode 104 spaced apart with a certain interval from the source electrode 102. The drain electrode 104 includes first and second drain electrodes 104a and 104b separately included within the first and second pixels P1 and P2.

In FIGS. 2A and 2B, at least a pair of electrodes, including a common electrode 106 and a pixel electrode 107 for generating in-plane electric field, are formed in the first and second pixels P1 and P2. Each of the common electrodes 106 and the pixel electrodes 107 are disposed along a side portion of the data line 103. In addition, a common electrode 106' that is formed at an outer edge of the pixel region is wider than the common electrode 106 formed at the center of the pixel region in order to prevent signal interference between the data line 103 and the pixel electrode 107. Specifically, the common electrode 106' formed at the outer edge of the pixel forms the in-plane electric field together with the pixel electrode 107 and blocks a data signal transmitted along the data line 103.

A common line 116 is formed at one side of the common electrodes 106 along the side of the gate line 101 and electrically connects the common electrodes 106. In addition, a pixel electrode line 117 for electrically connecting the pixel electrodes 107 is formed at one side of the pixel electrode 107. Accordingly, the pixel electrode line 117 overlaps with the common line 116 to form a first storage capacitor Cst1 at the first pixel P1 and forms a second storage capacitor Cst2 at the second pixel P2.

The first drain electrode 104a extends from the drain electrode 104 to the first pixel P1 and is connected with the pixel electrode 107 of the first pixel P1 through a first contact hole 109a. Similarly, a second drain electrode 104b extends from the drain electrode 104 to the second pixel P2 and is connected with the pixel electrode 107 of the second pixel n through the second contact hole 109b.

In FIG. 2B, a gate insulation film 108 is interposed between the gate electrode 101a and the semiconductor layer 105, and is formed over the entire surface of the substrate 110. In addition, a passivation film 111 is formed on the entire surface including the data line 103, and the pixel electrode 107 is formed on the passivation film 111. The pixel electrode can be made of a transparent conductive material, such as Indium Tin Oxide (ITO) or Indium Zinc Oxide (IZO).

In FIG. 2B, a black matrix 121 for blocking light leakage and a color filter 123 s formed at the second substrate 120, and first and second alignment films 112a and 112b for determining an initial alignment direction of liquid crystals are coated on the facing surfaces of the first and second substrates 110 and 120. Then, a liquid crystal layer 130 for controlling light transmittance according to a signal applied to the common electrode 106 and the pixel electrode 107 is formed between the first and second substrates 110 and 120.

According to the present invention, the overlap region of the gate electrode 101a and the source electrode 102 and the overlap region of the gate electrode 101a and the first and second drain electrodes 104a and 104b are always uniform, such that a relatively same parasitic capacitance is formed at every pixel region. Specifically, even if the pattern of the source/drain electrodes 102 and 104 is shifted along an upper or lower direction than the position set for the gate electrode 101a, the overlap region of the gate electrode 101a and the source and drain electrodes 102 and 104 can be uniformly maintained. For example, if the pattern of the source and drain electrodes 102 and 104 is shifted along an upper position, the overlap region of the gate electrode 101a and the first drain electrode 104a would be reduced while the overlap region of the gate electrode 101a and the second drain electrode 104b would increase. Thus, the amount of reduction of the overlap region of the gate electrode 101a and the first drain electrode 104a would be substantially equivalent to the amount of the increase in the overlap region of the gate electrode 101a and the second drain electrode 104b, the overlap region with the gate electrode 101a before the source and drain electrodes 102 and 104 are shifted.

According to the present invention, a pixel is divided into first and second pixels P1 and P2 that are adjacent (i.e., above and below the gate line 101) and the switching device 109 for driving the first and second pixels P1 and P2 is shared. Thus, the parasitic capacitance generated by the gate electrode 101a and the source/drain electrodes 102 and 104 is maintained to be relatively uniform for practically every pixel region. In this manner, uniformly maintaining the parasitic capacitance with respect to the entire pixel region means that the variance of a pixel voltage is uniform with respect to the entire pixel region and the pixel voltage is uniformly maintained. Since the pixel voltage is uniformly maintained, even (uniform) luminance can be maintained with respect to the entire pixel region and evenness (uniformity) of the image quality can be enhanced.

In addition, according to the present invention, the storage capacitor capability increases compared with the related art. Namely, in the related art, only the first storage capacitor is formed, but according to the present invention, the first and second storage capacitors Cst1 and Cst2 are formed at the first and second pixel regions, respectively, thereby doubling the storage capacitor compared with the related art. The storage capacitor charges a gate voltage while a gate signal is applied to the gate electrode 101a and maintains the charged voltage while a data voltage is being supplied to the pixel electrode 107 when the next gate line 101 is driven, thereby preventing a change in the voltage of the pixel electrode. The increase in the storage capacitor can effectively prevent flickers (or other visual distortions) due to a change in the voltage of the pixel electrode 107.

Figure 3:
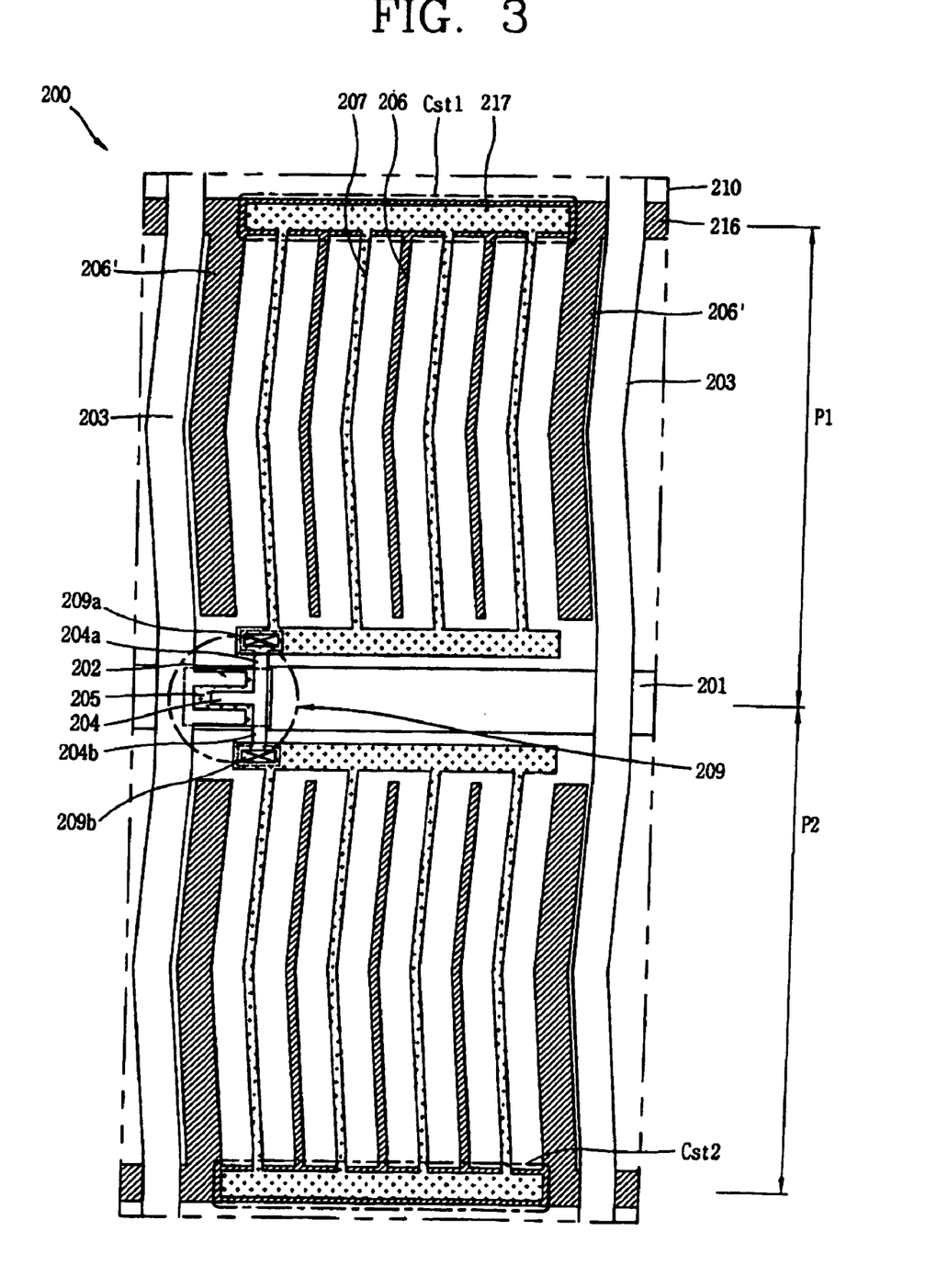
FIG. 3 is a plan view of another exemplary In-Plane Switching mode LCD device according to the present invention.

FIG. 3 is a plan view of another exemplary In-Plane Switching mode LCD device according to the present invention. In FIG. 3, other than the construction of the structure of the common electrode, the pixel electrode and the data line can be the same as that of the exemplary In-Plane Switching mode LCD device of FIGS. 2A and 2B.

In FIG. 3, and similar to the exemplary In-Plane Switching mode LCD device of FIGS. 2A and 2B, in an LCD device 200, a unit pixel is divided into a first pixel P1 and a second pixel P2 by a gate line 202, and the first and second pixels P1 and P2 share a switching device 209 formed on the gate line 201. The switching device 209 includes a gate electrode 201a formed as a portion of the gate line 201, and source and drain electrodes 202 and 204 formed on the gate electrode 201a. The drain electrode 204 includes a first drain electrode 204a extending to the first pixel P1 and a second drain electrode 204b extending to the second pixel P.

A common electrode 206 and a pixel electrode 207 for generating in-plane electric field are formed at the first and second pixels P1 and P2. The pixel electrode 207 formed at the first pixel P1 is connected with the first drain electrode 204a through a first contact hole 209a, and the pixel electrode 207 formed at the second pixel P2 is connected with the second drain electrode 204b through a second contact hole 209b. The common electrode 206 and the pixel electrode 207 are formed having an offset or bent structure, and the data line 203 disposed along the side of the common electrode 206 and the pixel electrode 207 can be also formed having the same offset of bent shape as the common electrode 206 and the pixel electrode 207. Accordingly, the offset or bent structure of the common electrode 206 and the pixel electrode 207 result in a two-domain structure in which a driving direction of the liquid crystals is symmetrical to offset any abnormal light due to birefringence characteristics of liquid crystals, thereby minimizing a color shift phenomenon. Namely, the common electrode 206 and the pixel electrode 207 have an offset or bent structure, and because the common electrode 206 and the pixel electrode 207 are symmetrical based on the offset or bent border line, the two-domain structure can be formed.

Figure 4:
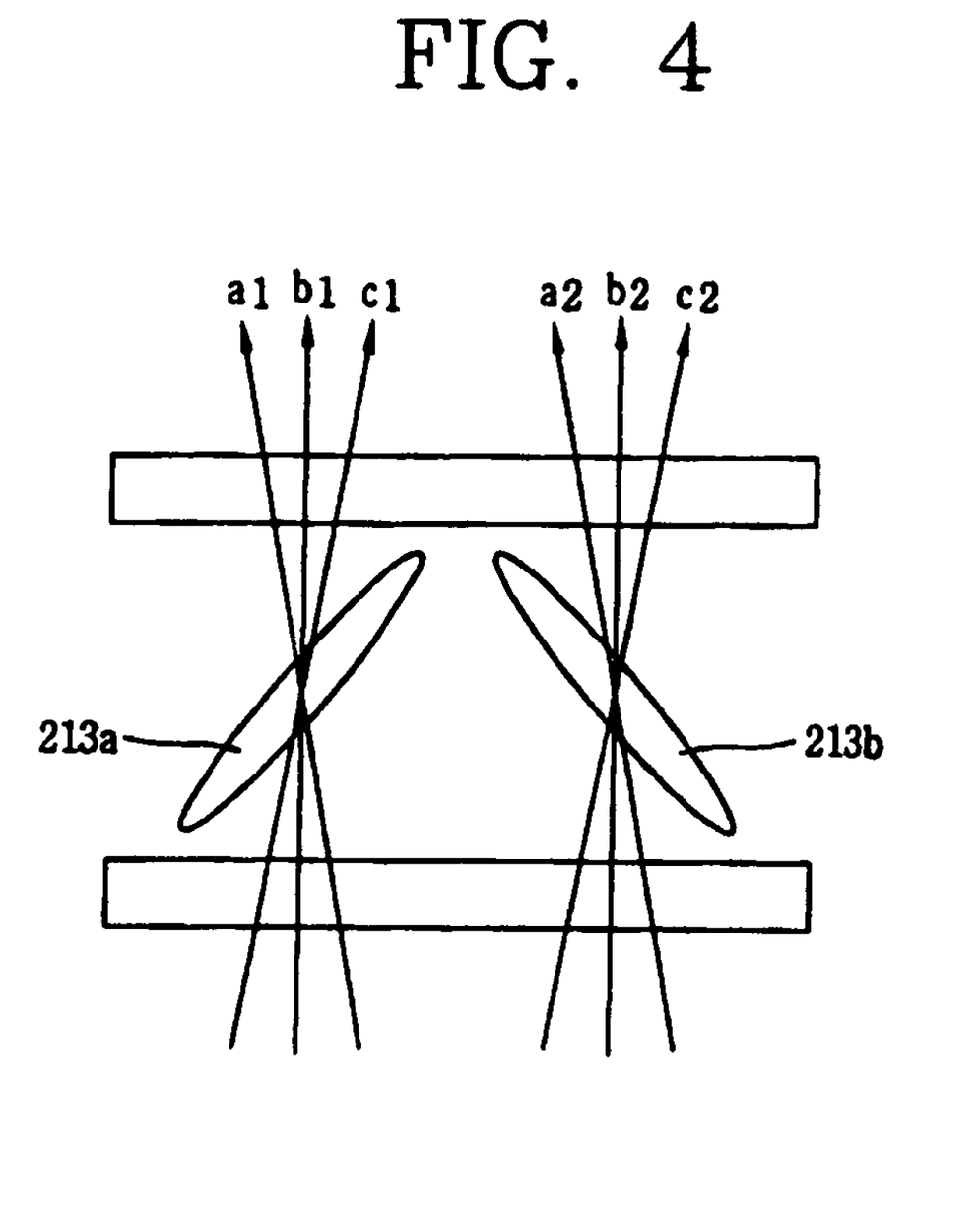
FIG. 4 is a schematic diagram showing an exemplary compensation of a viewing angle of 2 domains according to the present invention.

FIG. 4 is a schematic diagram showing an exemplary compensation of a viewing angle of 2 domains according to the present invention. In FIG. 4, since the liquid crystal molecules have the symmetrical arrangement in the two domains, a birefringence value of a1 of the first liquid crystal molecule 213a is compensated by a birefringence value of a2 of the second liquid crystal molecule 213b arranged in the opposite direction to the direction of the first liquid crystal molecule 213a, resulting in a birefringence value of about zero. Similarly, a birefringence value of c1 is compensated by c2. Accordingly, the color shift phenomenon according to the birefringence characteristics of the liquid crystals can be minimized, thereby preventing degradation of the image quality according to a viewing angle.

Figure 5:
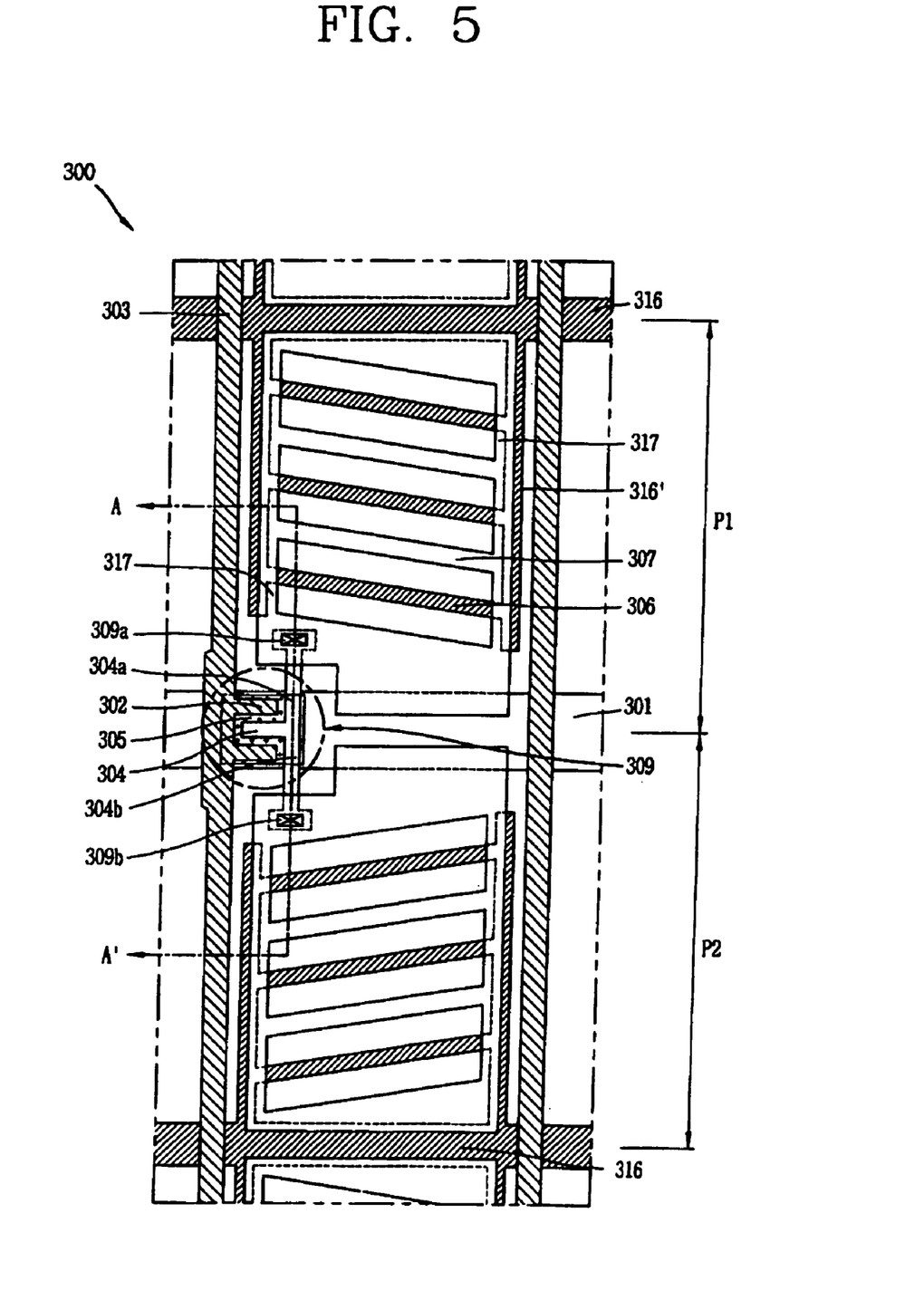
FIG. 5 is a plan view of another exemplary In-Plane Switching mode LCD device according to the present invention.

FIG. 5 is a plan view of another exemplary In-Plane Switching mode LCD device according to the present invention. In FIG. 5, similar to the IPS mode LCD devices of FIGS. 2A, 2B, and 3, in an LCD device 300, a unit pixel is divided into a first pixel P1 and a second pixel P2 by a gate line 301. The first and second pixels P1 and P2 share a switching device 309 formed on the gate line 301. A switching device 309 includes a gate electrode 301a formed as a portion of the gate line 301, and source and drain electrodes 302 and 304 formed on the gate electrode 301a. The drain electrode 304 includes a first drain electrode 304a extending to the first pixel P1 and a second drain electrode 304b extending to the second pixel P2.

A common electrode 306 and a pixel electrode 307 for generating in-plane electric field are formed at the first and second pixels P1 and P2. The pixel electrode 307 formed at the first pixel P1 is connected with the first drain electrode 304a through a first contact hole 309a, and the pixel electrode 307 formed at the second pixel P2 is connected with the second drain electrode 304b through a second contact hole 309b. The common electrode 306 and the pixel electrode 307 are formed along the side of the gate line 301 at a certain angle to the gate line 301. For example, the angle does not exceed 90°, and the common electrodes 306 and the pixel electrodes 307 are symmetrical with respect to the gate line 301. The reason why the common electrodes 306 and the pixel electrodes 307 are formed in the slanted line with the certain angle with respect to the gate line 301 and symmetrical to the gate line 301 is to form two domains.

A common electrode connection line 316' is formed at one side of the common electrodes 306, disposed along the side of and parallel to the data line, and is electrically connected to the common electrodes 306. A common line 316 is connected to the common electrode connection line 316' and disposed along the side of the gate line 301 to divide the first and second pixels P1 and P2 together with the data line 303.

A pixel electrode line 317 for electrically connecting the pixel electrodes 307 is formed at one side of the pixel electrode 307. A portion of the pixel electrode line 317 overlaps with the common electrode connection line 316' and the common line 316 to form a storage capacitor.

According to the present invention, the pixel electrode 307 is formed to be almost perpendicular to the data line 303, and thus signal interference of the data line 303 can be reduced. Specifically, in the IPS mode LCD devices of FIGS. 2A, 2B, and 3, since the pixel electrode is formed to be along a straight line with the data line, the entire length of the pixel electrode is affected by the signal interference of the data line 303. Comparatively, because the pixel electrode 307 is formed to be almost perpendicular to the data line 303, less signal interference of the data line 303 is made to the pixel electrodes 307 compared with the previous embodiments.

Figure 6A:
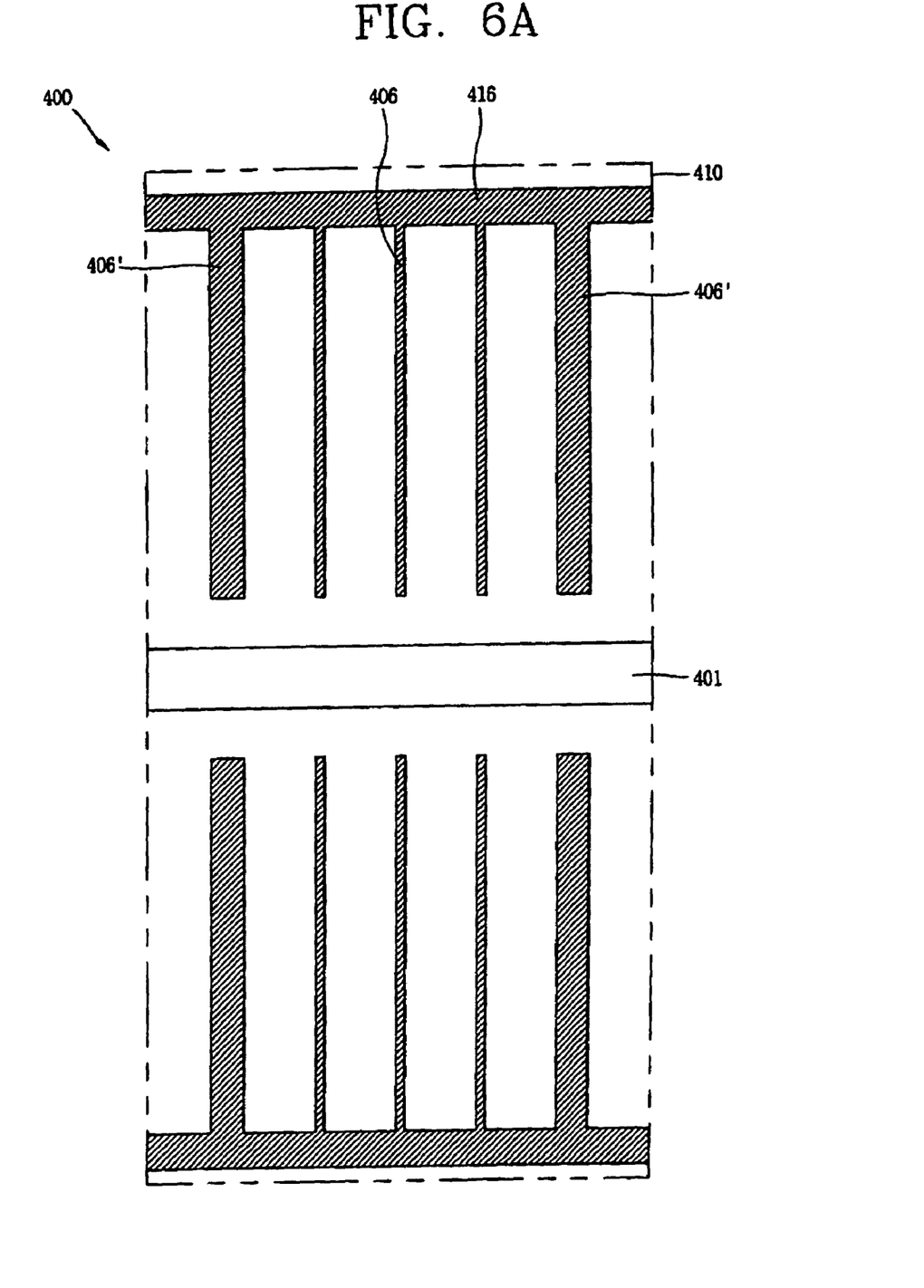
FIGS. 6A to 6C are plan views of an exemplary fabrication process of In-Plane Switching mode LCD device according to the present invention.
Figure 6B:
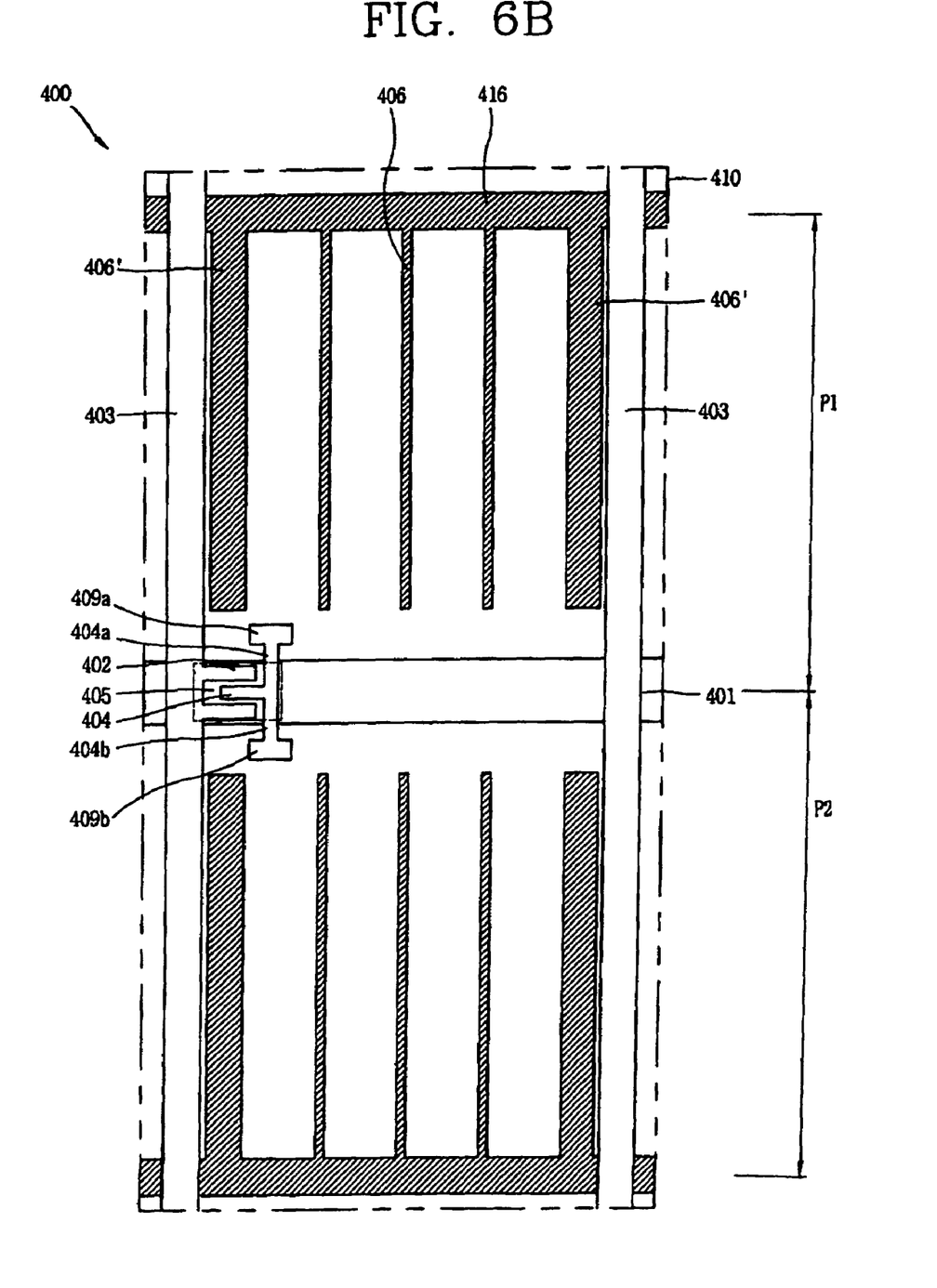
Figure 6C:
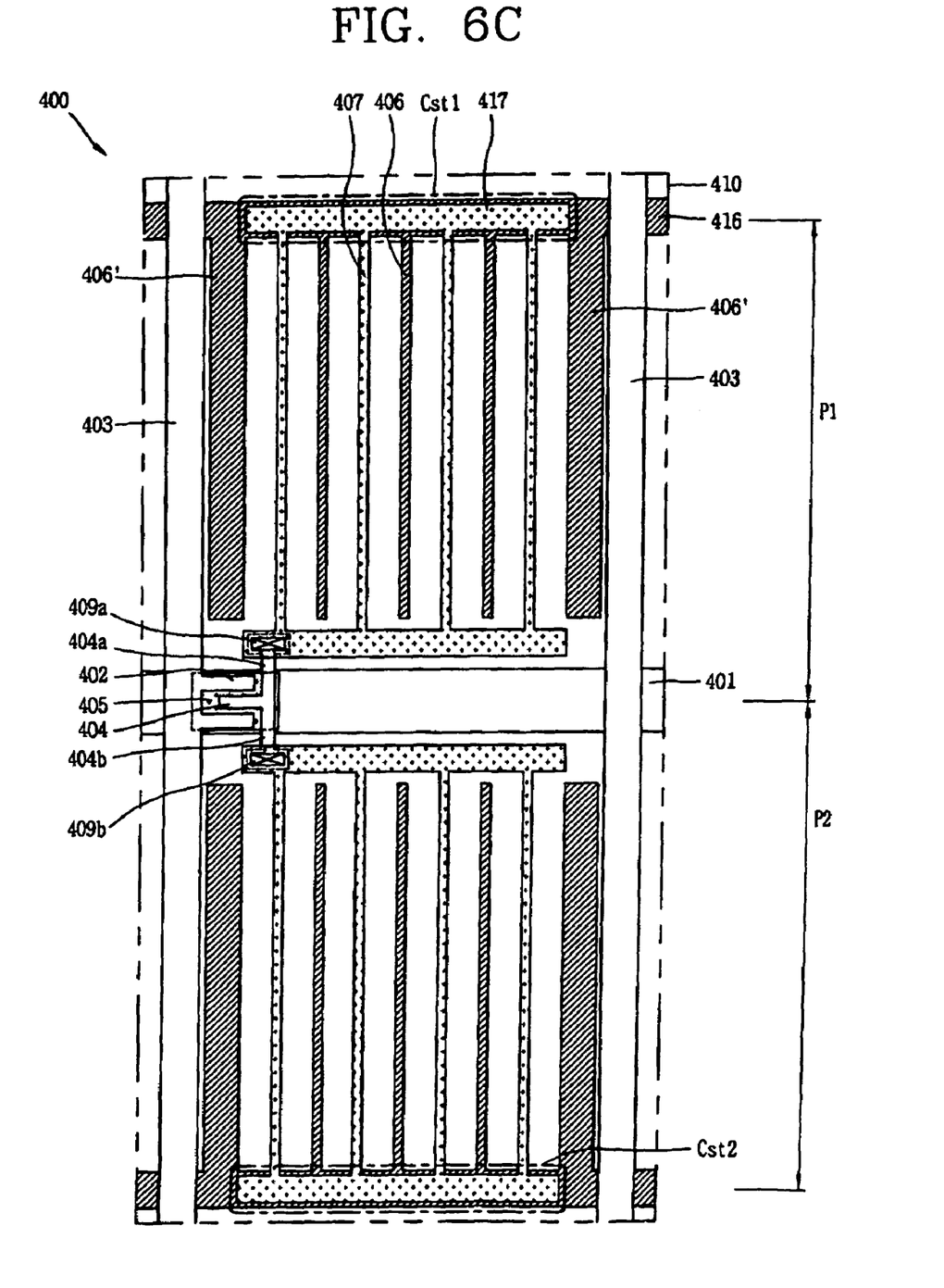

FIGS. 6A to 6C are plan views of an exemplary fabrication process of In-Plane Switching mode LCD device according to the present invention. In FIG. 6A, a transparent first substrate 410 is prepared upon which a first metal material, such as Cu, Ti, Cr, Al, Mo, Ta, an Al alloy, or the like, is deposited. Then, the deposited first metal material is patterned to form a gate line 401 to function as a gate electrode, common electrodes 406 and 406', and a common line 416 for electrically interconnecting the common electrodes 406 and 406'. Next, an inorganic substance, such as SiNx or SiOx, is deposited on the entire surface of the transparent substrate 410 including the gate line 401 and the common electrodes 406 and 406'.

In FIG. 6B, amorphous silicon and n+ amorphous silicon are stacked at an upper portion of a gate insulation film corresponding to the gate line 401 and then patterned to form a semiconductor layer 405 on the portion of the gate line 401 that functions as the gate electrode. Then, a second metal material, such as Cu, Mo, Ta, Al, Cr, Ti, Al alloy, or the like, is deposited on the entire surface of the transparent substrate 410 including the semiconductor layer 405. Next, the deposited second metal material is patterned to form a data line 403 disposed to be perpendicular to the gate line 401 and dividing a pixel region into first and second pixels P1 and P2 together with the gate line 401, a source electrode 402 extending from the data line 403. In addition, a drain electrode 404 is formed spaced apart from the source electrode 402 with a certain interval therebetween and having a first drain electrode 404a extending to the first pixel P1 and a second drain electrode 404b extending to the second pixel P2. Thus, a TFT is formed for switching the first and second pixels P1 and P2. Next, an inorganic substance, such as SiNx or SiOx, or an organic substance, such as benzocyclobutene or acryl, is coated on the resulting structure on the transparent substrate 410 including the TFT 409 and the data line 403 to form a passivation film (not shown).

In FIG. 6C, the passivation film is patterned to form a first contact hole 409a exposing the first drain electrode 404a and to form a second contact hole 409b exposing the second drain electrode 404b. Next, a transparent conductive film, such as Indium Tin Oxide (ITO) or Indium Zinc Oxide (IZO), is deposited at an upper portion of the passivation film, and then patterned to form a pixel electrode 407 and a pixel electrode line 417. The pixel electrode 407 generates an in-plane electric field together with the common electrode 406, and the pixel electrode line 407 forms a first storage capacitor Cst1 at the first pixel P1 and a second storage capacitor (Cst2) at the second pixel P2 by overlapping with the common line 416.

Although not specifically shown, a second substrate including a black matrix and a color filter is prepared and attached with the first substrate, which is fabricated through the processes shown in FIGS. 6A to 6C, to fabricate an IPS mode LCD device according to the present invention.

According to the present invention, a pixel is divided into the first and second pixels by the gate line and the first and second pixels are simultaneously driven by the switching device formed on the gate line, whereby the parasitic capacitance generated by the switching device can be uniformly formed over the entire pixel region. In addition, one of the basic concepts of the present invention is that the first and second pixels neighboring at above and below positions share the switching device formed at the crossing of the gate line and the data line to form a relatively uniform parasitic capacitance over the entire pixel region. In addition, the common electrode and the pixel electrode are not limited to the particular structures detailed above. Accordingly, the present invention can include any LCD device, such as IPS or TN, but not limited to the IPS or TN LCD devices, so long as it can generate a uniform parasitic capacitance.

It will be apparent to those skilled in the art that various modifications and variations can be made in the LCD device and fabricating method thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display device, comprising:
   first and second substrates;
   a liquid crystal layer formed between the first and second substrates;
   a plurality of pixel regions defined in a matrix configuration on the first substrate;
   a plurality of gate lines extending along a first direction on the first substrate and dividing each of the pixel regions into first and second sub-pixel regions that are adjacent to each other along a second direction substantially perpendicular to the first direction;
   a plurality of data lines extending along the second direction and crossing the gate lines;
   a plurality of common and pixel electrodes for generating an in-plane electric field in the first and second sub-pixel regions, the common and pixel electrodes being disposed to be substantially parallel to the gate line;
   common electrode connection lines connected electrically to the common electrodes, the common electrode connection lines being parallel to the data line;
   common lines connected to the common electrode connection lines, the common line being parallel to the gate line;

pixel electrode lines connected electrically to the pixel electrodes, the pixel electrode lines being parallel to the data line; and a switching device formed at the crossing the gate and data lines and driving the first and second sub-pixel regions, wherein the switching device includes a gate electrode, a semiconductor layer, and source and drain electrodes, and the drain electrode includes a second drain electrode connected with the pixel electrodes of the first sub-pixel region and a third drain electrode connected with the pixel electrodes of the second sub-pixel region, the source electrode including first and second source electrodes extruded from the data line and the drain electrode including a first drain electrode disposed between the first and the second source electrodes over the gate electrode and the second and third drain electrodes branched from the first drain electrode to the first and second sub-pixel regions through the gate electrode, wherein the common electrode connection lines are partially overlapped with the pixel electrode lines at both sides of the first sub-pixel region and the second sub-pixel region to form a first storage capacitor at the first sub-pixel region and a second storage capacitor at the second sub-pixel region and a common electrode connection line adjacent to the data line is extended from a pixel electrode line toward the data line so that the side of the common electrode connection line is facing with the side of the data line.

2. The device according to claim 1, further comprising:
a gate insulation film interposed between the gate and data lines; and
a passivation film formed over the gate insulation film.

3. The device according to claim 2, wherein the pixel electrodes are formed on the passivation film.

4. The device according to claim 1, wherein the common electrodes and pixel electrodes are slanted to the gate line.

5. The device according to claim 1, wherein the common and pixel electrodes of the first sub-pixel region are symmetrical with respect to the gate line with those of the second pixel-region.

6. The device according to claim 1, wherein the second drain electrode is connected with the pixel electrodes of the first sub-pixel region through a first contact hole and the third drain electrode is connected with the pixel electrodes of the second sub-pixel region through a second contact hole.

7. A method for fabricating a liquid crystal display device, comprising:

preparing first and second substrates;

forming a plurality of gate lines, common lines, and common electrode connection lines arranged on the first substrate and a plurality of common electrodes extending from the common lines;

forming a plurality of data lines arranged crossing the common lines to define a plurality of pixel regions, each pixel region including first and second sub-pixel regions adjacent to each other, a source electrode including first and second source electrodes extruded from the data line on the gate line, and a drain electrode spaced apart from the source electrode and divided into first and second drain electrodes extended to the first and second sub-pixel regions through the gate electrode;

forming a plurality of pixel electrodes, for generating an in-plane electric field together with the common electrodes in the first and second sub-pixel regions, a plurality of pixel electrode lines for electrically interconnecting the pixel electrodes, and first and second storage capacitors in the first and second sub-pixel regions by overlapping partially the pixel electrode lines with the common electrode connection lines at the both sides of the first and second sub-pixel regions; and forming a liquid crystal layer between the first and second substrates, wherein the common and the pixel electrodes are substantially parallel to the gate line and the common electrode connection lines and the pixel electrode lines are parallel to the data line, and a common electrode connection line adjacent to the data line is extended from a pixel electrode line toward the data line so that the side of the common electrode connection line is facing with the side of the data line.

8. The method according to claim 7, further comprising:
forming a semiconductor layer between the gate line and the source and drain electrodes;
forming a passivation film on the entire surface of the substrate including the source and drain electrodes; and
exposing a portion of the first and second drain electrodes.

9. The method according to claim 7, wherein the pixel electrodes are made of a conductive material including at least one of Indium Tin Oxide and Indium Zinc Oxide.

10. The method according to claim 7, wherein the step of preparing the second substrate comprises:
forming a black matrix on the second substrate; and
forming a color filter on the black matrix.

* * * * *